Figure 1:
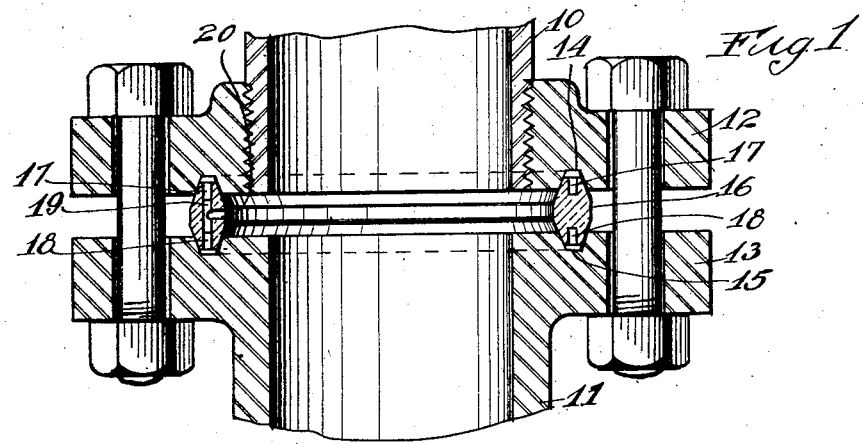

Dec. 29, 1925.

O. E. OLESON

PIPE FITTING

Filed August 30, 1920

1,567,813

INVENTOR.
OLAF E. OLESON

BY Albert C. Bell

ATTORNEY.

Patented Dec. 29, 1925.

1,567,813

UNITED STATES PATENT OFFICE.

OLAF E. OLESON, OF CHICAGO, ILLINOIS.

PIPE FITTING.

Application filed August 30, 1920. Serial No. 406,884.

*To all whom it may concern:*

Be it known that I, OLAF E. OLESON, a citizen of the United States, residing at Chicago, in the county of Cook and State of Illinois, have invented a new and useful Improvement in Pipe Fittings, of which the following is a specification.

My invention relates to a form of pipe fitting for making tight joints between the adjacent ends of pipes whether said ends are provided with connecting flanges or union connections, and the joints thus formed are particularly adapted to hold fluid in the pipes under high pressure without leakage.

I am aware that various forms of fittings for this purpose have heretofore been proposed, for example, gaskets of relatively soft material and also that tapered rings have been used formed integrally with the flanges or other connections on one side of the joints and extending therefrom to engage tapered grooves formed in the adjacent flanges or connections when the joints are made between the pipe ends. Furthermore it has been proposed with the latter construction to groove the ends of the tapered rings and make the taper of said rings somewhat sharper than the taper of the adjacent ring receiving grooves to cause the edges of the tapered rings to be compressed somewhat when the connections are drawn together. I find that soft gaskets cannot be depended upon for high pressures and that the tapered ring construction referred to is open to the objections, first, that the rings are readily injured and rendered useless because the rings are necessarily carried by and project from the connections while the pipes are being handled and put in place for use; and furthermore said rings must necessarily be of the same material as the flanges with which they are integral and cannot therefore be made of material, such as bronze, adapted to best make a tight non-corrosive joint with the other parts, at the same time permitting the flanges to be made of material, such as steel, adapted to best withstand the large strains to which the connections are subjected, due to the high pressures employed.

By my invention, the fittings are in the form of rings separate from the flanges or connections with which they cooperate to form tight joints and said rings may be made of any desired non-corrosive material such as bronze or other alloy, and the flanges and connections may be made of material selected solely to meet the requirement of strength; furthermore said rings, being separate from said flanges, may be safely kept from injury away from the work while the pipe is being erected and put in place as the last step in the erection; again, since the flanges and connections carry no projecting parts involved in making the tight fits between adjacent pipes, but on the other hand are all provided with grooves for receiving the rings, the said flanges and connections cannot readily be injured at said grooves during handling and erection. The rings being separate parts may more readily be accurately made than where they project from larger parts, and may be carried in stock for use on any job of the same size pipe, making it unnecessary to make and stock one ring for each flange and connection of pipe as is required where the rings are integral with the flanges and connections. By my invention I further improve the fitting, by tapering the rings so they form surface fits with the receiving grooves, and the rings are constructed so that the pressures restrained by the packed joints are exerted within the rings themselves to expand them to tightly fit the cooperating surfaces of the grooves.

My invention will best be understood by reference to the accompanying drawings, showing a preferred embodiment thereof, in which—

Figure 2:
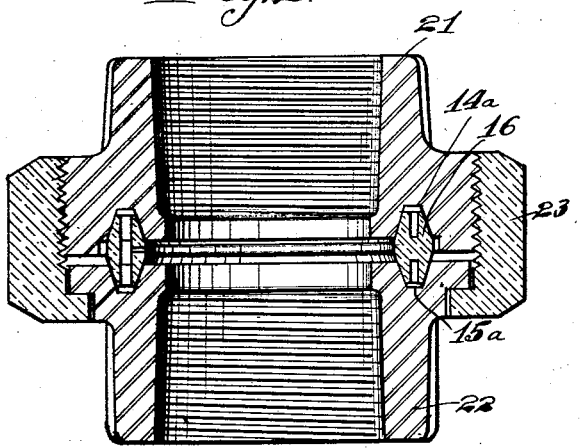
Figure 3:
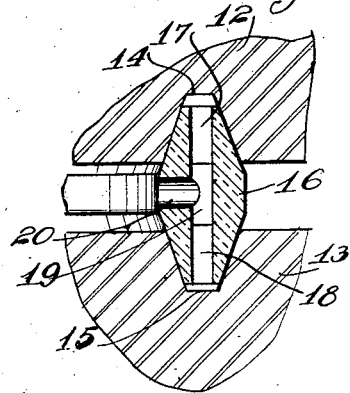
Figure 4:
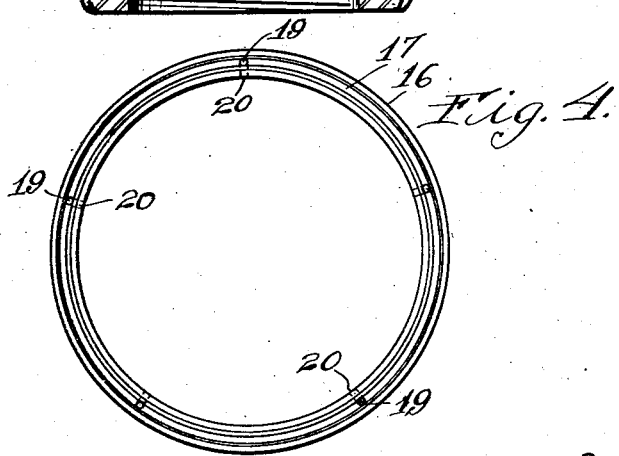

Fig. 1 is a longitudinal, sectional view through two pipes and flanges with my fitting in place, Fig. 2 is a view similar to Fig. 1 of a union connector equipped with my fitting, Fig. 3 is a view similar to Fig. 1, to an enlarged scale, of one side of the fitting and shows its relation to the cooperating grooves in the pipe flanges, and Fig. 4 is an end view of the fitting or packing ring before being placed in a joint.

Similar numerals refer to similar parts throughout the several views.

As shown in Figs. 1 and 3, two pipes 10 and 11, having flanges 12 and 13 are shown in the position assumed when clamped together by suitable means, for example bolts, as indicated. The flanges 12 and 13 have formed therein oppositely disposed end grooves 14 and 15 having tapered cross-sections of the same inclination as the tapered ends of the metal packing ring or fitting 16, which preferably is made of bronze or other non-corrodible alloy or metal of sufficient hardness to withstand the compression strains to which it is subjected by bolting or forcing the flanges or connections together with the ring in place.

The ring 16 has formed in its ends annular grooves 17 and 18 substantially as deep as the extent axially of the engagement of the ring with the co-operating flanges or connections. At intervals around the ring, holes 19 are drilled or formed axially through the ring connecting the grooves 17 and 18. Each hole 19 has opening into it a radial hole 20 extending centrally from the inside of the ring into the hole 19.

As a result of the construction described, in making a connection between two pipes, a ring 16 is placed between the adjacent flanges or connections, entering the grooves therein to receive said ring. The flanges or connections are then drawn forcibly together until the ring rests tightly against the inclined walls of each groove which it fits, and further drawing together of the flanges or connections is prevented by the resistance of the ring to distortion by compression. The connection thus made is as fluid tight as the fit of the parts will permit and since the inclined surfaces of the ring and grooves may be made by grinding, a degree of fit may readily be secured that is entirely satisfactory and safe for low fluid pressures without the use of further construction for insuring a tight fit. For high fluid pressures, however, I find it desirable to insure a tight fit of the ring by communicating the fluid pressure through the holes 20 and 19 from the inside of the pipe, into the grooves 17 and 18, where said pressure serves to slightly expand or spring apart the relatively thin walls of each end of the ring. Since the ring fits the grooves before the application of said fluid pressure, the slightest tendency of the walls of either end of the ring to separate results in holding the inclined surfaces together so positively that leakage along said surfaces cannot occur. Furthermore, it will be observed that the higher the pressure in the pipes is, the greater will be the tendency of the ring end walls to separate radially and thus the pressures between the inclined walls of the ring and grooves preventing leakage are proportional to the fluid pressures tending to cause the leakage. As a result of this, when the fluid pressure in the pipes is relieved, as for example, where it is desired to change or repair the pipe assembly, the joints may readily be separated and the rings may be used again for packing the same or other joints since said rings are not deformed in any manner by use.

In Fig. 2, I show my improved fitting or packing ring 16 applied to a union connector consisting of the members or connections 21 and 22 and an internally threaded collar or sleeve 23 for drawing them together, said connections being provided with grooves 14ª and 15ª, similar to the grooves 14 and 15 above described, for receiving the ring 16. This construction, as far as the connection and packing between the pipes is concerned is substantially the same and the mode of operation of the ring 16 and its advantages are identical with those above described in connection with Figs. 1, 3 and 4.

While I have shown my invention in the particular embodiment above described, it will be understood that I do not limit myself to this exact construction in carrying out my invention, as I may employ equivalents thereof, known to the art at the time of the filing of this application without departing from the scope of the appended claims.

What I claim is:

1. In a device of the class described, the combination of pipe connections having end grooves provided with outwardly diverging walls, means for drawing said connections together and a metal ring having inclined ends of the same inclination as and fitting the corresponding walls of said grooves, said ring having grooves in its ends and a communicating passage between said grooves and the interior of said ring, the grooves in said ring being substantially as deep as the engagement between said ring and the grooves in said connections.

2. In a device of the class described, the combination of pipe connections having end grooves provided with outwardly diverging walls, means for drawing said connections together and a metal ring having inclined ends of the same inclination as and fitting the corresponding walls of said grooves, said ring having grooves in its ends, axial holes connecting the grooves in said ring and radial holes connecting said axial holes with the interior of said ring, the grooves in said ring being substantially as deep as the engagement between said ring and the grooves in said connections.

3. As a means for packing a joint between pipe connections having tapered end grooves and devices for drawing the connections together, a packing ring having tapered ends, each of the same angle as the angle of the tapered groove to be engaged thereby and having a passageway opening at its ends and at the mid portion of the inner surface of the packing ring.

4. As a means for packing a joint between pipe connections having tapered end grooves and devices for drawing the connections together, a packing ring having tapered ends, each of the same angle as the angle of the tapered groove to be engaged thereby, said packing ring having grooves in its ends and axial holes connecting the grooves with the inner surface of the ring.

In witness whereof, I hereunto subscribe my name this 27th day of August, A. D. 1920.

OLAF E. OLESON.